V. G. APPLE.
SYSTEM OF ELECTRIC DISTRIBUTION.
APPLICATION FILED JULY 22, 1912.
1,220,165.
Patented Mar. 27, 1917.
4 SHEETS—SHEET 1.
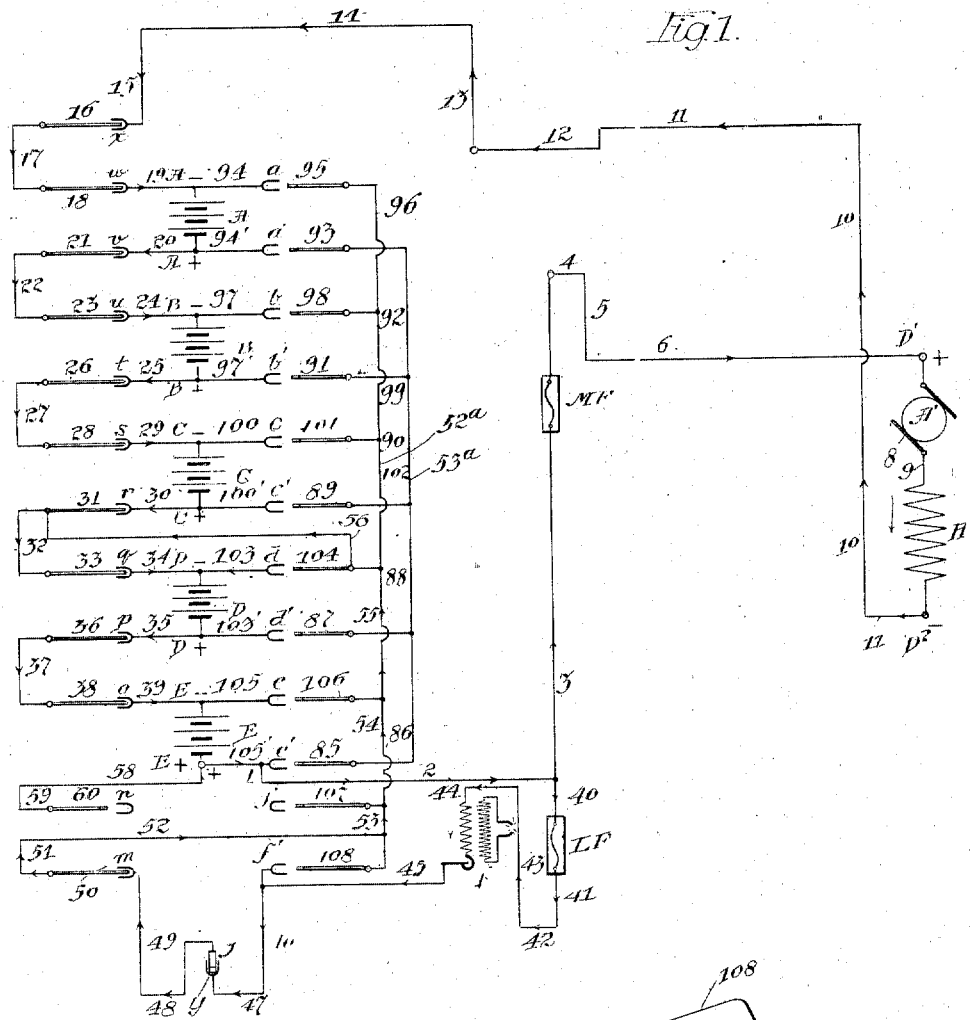
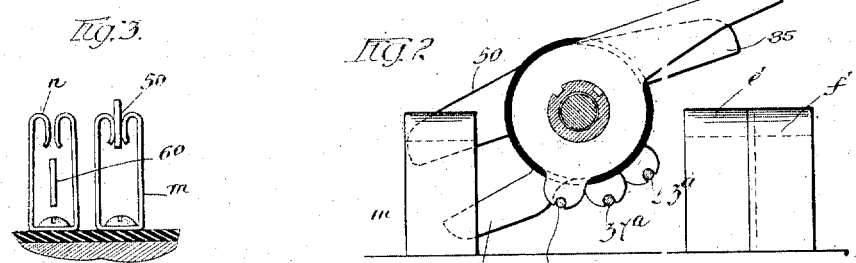
Witnesses:
Robert H. Weir
Arthur Carlson
Inventor:
Vincent G. Apple
by Foree Bain & May
Attys.

V. G. APPLE.
SYSTEM OF ELECTRIC DISTRIBUTION.
APPLICATION FILED JULY 22, 1912.

1,220,165.

Patented Mar. 27, 1917.
4 SHEETS—SHEET 2.

Witnesses:
Robert H. Weir
Arthur Carlson

Inventor
Vincent G. Apple.
Forée Bain May
Attys

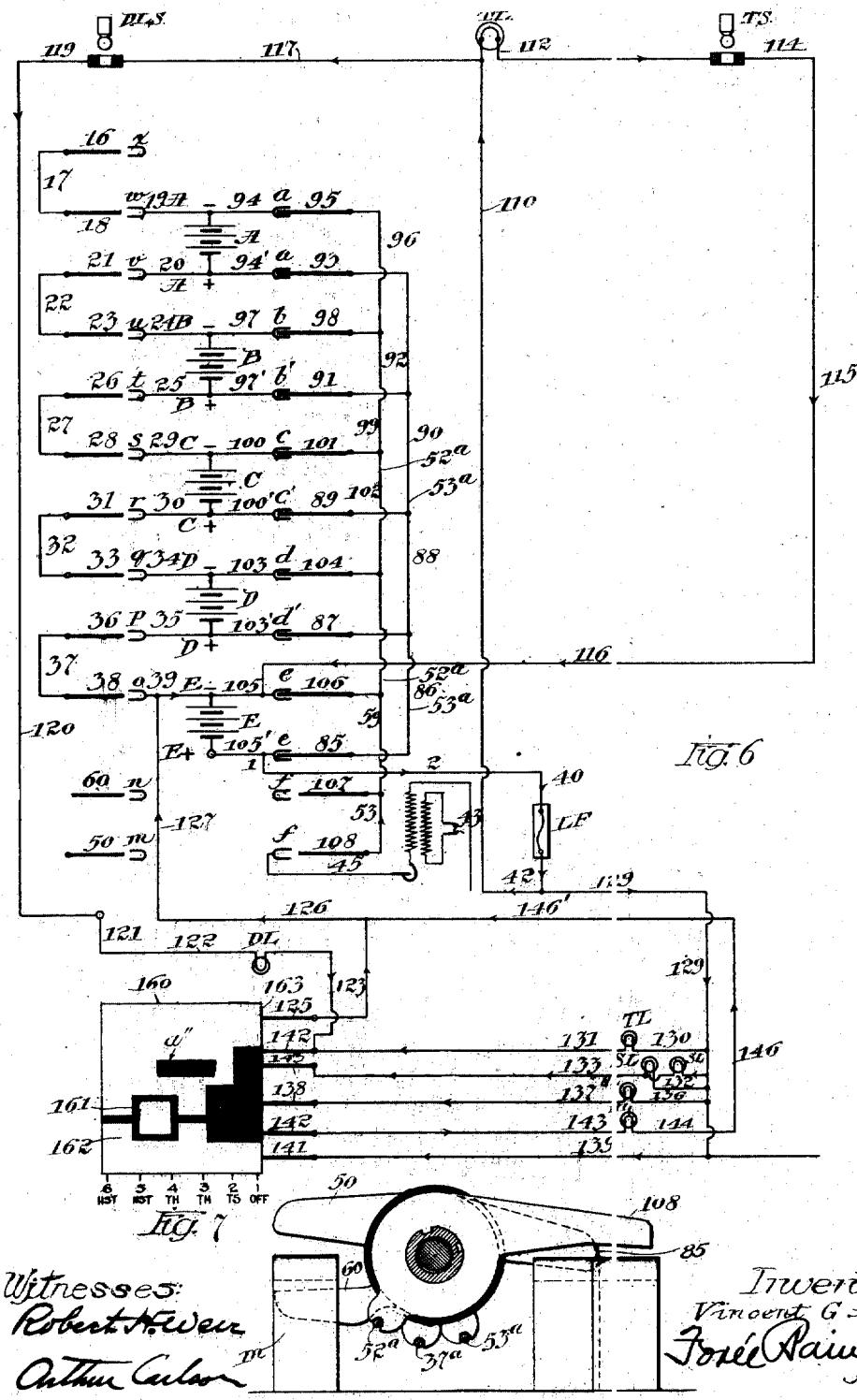

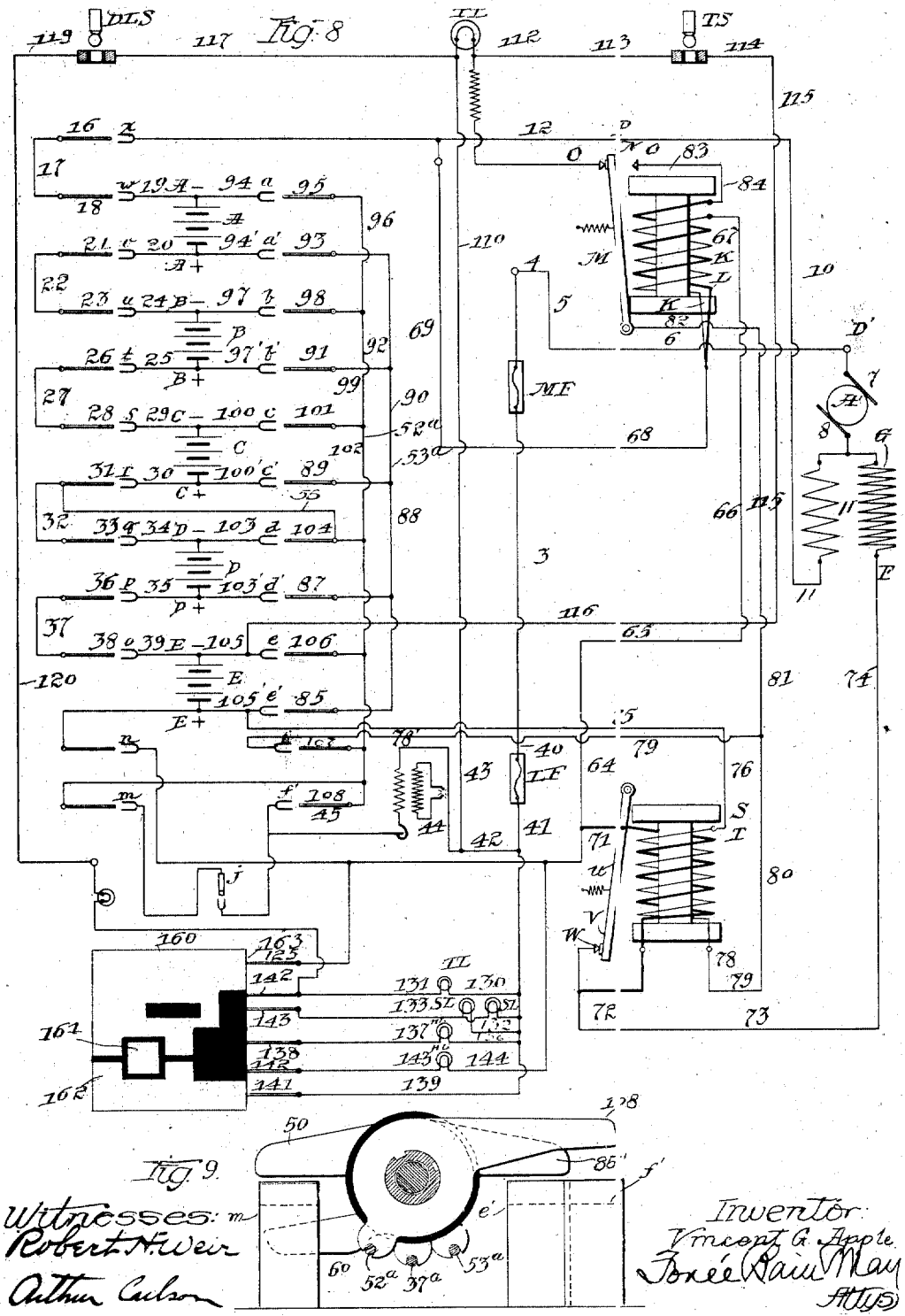

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

SYSTEM OF ELECTRIC DISTRIBUTION 1,220,165.   Specification of Letters Patent.   Patented Mar. 27, 1917.

Application filed July 22, 1912. Serial No. 710,864.

*To all whom it may concern:*

Be it known that I, VINCENT G. APPLE, a citizen of the United States, residing at Dayton, in the county of Montgomery and State of Ohio, have invented certain new and useful Improvements in Systems of Electric Distribution, of which the following is a specification.

My invention relates to systems of electric distribution.

One of the objects of my invention is to provide a system of electric distribution especially adapted for automobiles, motor boats, and the like, driven by internal combustion engines, whereby the engine thereof may be easily and quickly started; the vehicle lighted and the spark for igniting the compressed fuel charge in the cylinder of such engine, provided.

Other and further and more specific objects of my invention will become readily apparent to persons skilled in the art, from a consideration of the following description when taken in conjunction with the drawings, wherein—

Figure 1 is a diagrammatic representation of the circuits at the time when the switch is turned to position to cause the dynamo electric machine to act as a motor in conjunction with a storage battery, to start the engine;

Fig. 2 is an end view of a switch, showing the respective positions of the rocking blades and the stationary coacting clips for accomplishing this result;

Fig. 3 is a fragmentary side view of the same;

Fig. 6 is a diagram similar to that shown in Fig. 1, showing connections effected by the operation of the controller switch as when the batteries alone are used for lighting the vehicle;

Fig. 7 shows an end view of the respective positions of the switch blades and clips at this time;

Fig. 8 shows all of the circuits of the system, open, which momentarily obtains at a time when a shift is made from series to parallel connection;

Fig. 9 shows the position of the controller switch blades and clips at this time.

In all the views the same reference characters indicate similar parts.

Figure 4:
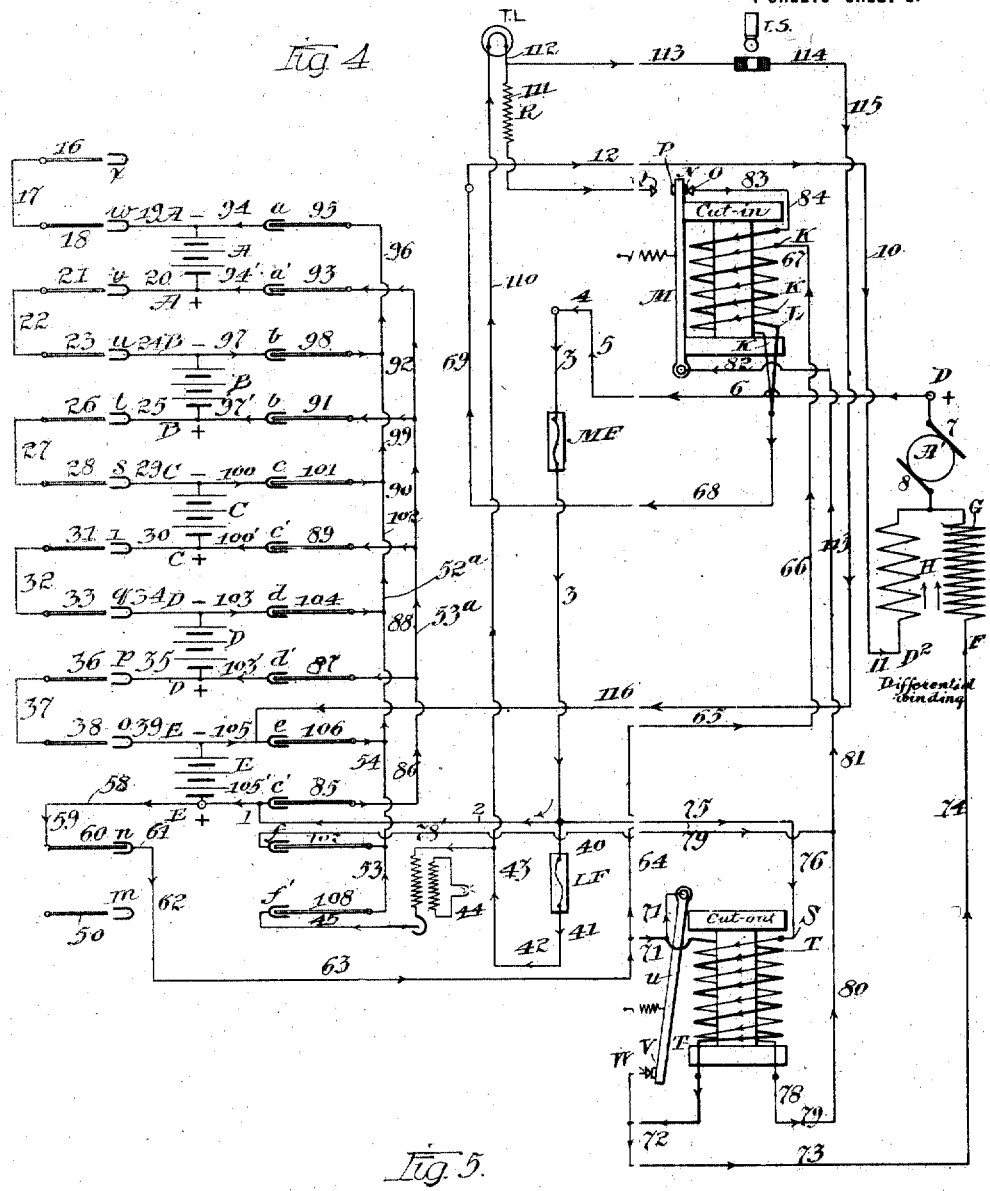
Fig. 4 shows the connections, as when the dynamo is used for charging the storage batteries.

In the present exemplification for carrying my invention into effect I provide 15 cells of storage batteries of approximately 2 volts each, having a difference of potential, when connected in series, of 30 volts, and I group these cells into independent batteries, each comprising 3 cells making five groups of 6 volts for each group, when the said batteries are connected in parallel relation or 30 volts when connected in series.

The batteries are indicated by reference letters A, B, C, D, and E. Each of the battery terminals are connected to two sets of stationary switch clips, those on the right hand side being indicated by $a, a', b, b', c, c', d, d', e, e', f$, and $f'$, while those on the left hand side are indicated by $m, n, o, p, q, r, s, t, u, v, w$ and $x$. Two clips on the right hand side and two on the left hand side are not directly connected to the battery terminals.

By referring to Fig. 8, in which all of the circuits are open, it will be observed that each of the battery groups is independent from all of the other groups and that when the switch is in open circuit position, as shown in this figure, there is no connection between any two of the groups, this condition occurs, as heretofore stated, at a time when the blades of the switch are rocked to change from starting to running position and vice versa.

The field magnet of the dynamo electric machine is provided with two field magnet windings. G is the shunt winding which is connected across the armature terminals and H is the series winding which is in series with the armature, when the dynamo electric machine is acting as a generator. These two windings are magnetically opposed to each other so that tendency toward increase of current in the series winding, will, by decreasing the field magnetism, operate thereby to decrease the electro-motive force by the armature of the dynamo, and by this means the output of the dynamo is held in check to some extent and when used in connection with another means to be hereinafter described, the current from the dynamo can never be in excess of that required.

J is a switch contained in the ignition controlling circuit, for controlling the ignition apparatus I. This circuit is adapted to be closed by an independent supplementary switch, as shown or other apparatus, before the engine can be started or become self-propelling by the operation of the batteries, in accordance with the circuits shown in diagram, Fig. 1.

This specific feature of my invention is fully described and claimed in a copending application filed by me the 22nd day of July, 1912, and identified by Serial Number 710.865.

Fig. 2 shows a controller switch having a plurality of blades adapted for engagement with a corresponding number of clips and adapted to be rocked from a common axis for engagement with separate sets of clips located on each side thereof. In the diagram the blades and clips are diagrammatically represented, but they are supposed to bear the same relation to the moving instrumentality that the blades in Fig. 2 are shown to bear thereto.

This specific construction of the controller switch, as indicated in Fig. 2 for carrying the present invention into effect, is fully described and specifically claimed in a copending application filed by me the 8th day of August, 1912, and identified by Serial Number 714,086.

M F, indicates the motor fuse, or the fuse in the main circuit connecting the batteries and the motor, or dynamo electric machine, and L F, indicates the lighting fuse, or the fuse that connects the lighting circuits to the main circuits of the dynamo and of the batteries.

Prior to the act of starting the engine, by means of the dynamo as a motor, by the operation of the batteries, the switch J, in the controlling circuit, must first be closed. In my copending application this switch is controlled by the lever which is used to retard and advance the spark of the engine, and preliminarily to starting, this spark lever must be placed in such position as to retard the spark as a condition precedent to the operation of the engine when the electric motor has turned it over, or rotated its main shaft a sufficient number of times for it to become self propelling.

After the switch J has been closed, the controller is rocked, on its axis so that the blades, on the left hand side, make contact with their respective clips, with exception of blade 60, which is brought into a downward position and breaks contact with its clip, for a reason to be hereafter described.

By closing the circuits with the blades on the left hand side of the diagram the groups of batteries are placed in series circuit with regard to each other, and the entire electromotive force of the combined batteries is applied to the dynamo, which then becomes a motor. The circuit may then be traced as follows: From E plus, which is the positive terminal of the batteries in series, over the wires 1, 2, 3, 4, 5, 6, to the positive terminal D′ of the dynamo electric machine, to the brush 7 through the armature A′ to the brush 8 over the wire 9 and through the series field winding H, in a direction opposite to that in which the current would pass when the dynamo is acting as a generator, to the negative terminal of the dynamo D², over the wires, 10, 11, 12, 13, 14, 15, to the clip $x$ through the blade 16, connecting wire 17, through the blade 18 to the clip $w$, and in like manner over the wire 19 to the negative terminal of the battery A, through the battery A, and thence through the succeeding switches and batteries, in the same manner, until arriving back to the point E plus. This completes the circuit of all of the batteries in series through the dynamo electric machine armature A′ and the series field, and makes a motor of the dynamo, which will be rotated on account of the reversal of current in the series winding, in the same direction in which it is turned by the engine, and will thereby drive the engine until the latter becomes self propelling.

The heavy draft of current from the batteries at this time, tends to decrease their electro-motive force slightly and during the process of starting an extra hot spark is desirable; I therefore include a greater number of batteries in the igniting circuit than are required during normal running. The igniting circuit may now be traced as follows: Starting from the plus terminal of the battery E, over the wires 1 and 2, the wire 40 and through the fuse, L F, over the wires 41, 42, 43, 44, through to the primary coil of the igniting device, over the wires 45, 46, and 47, through the supplementary switch J, over the wires 48 and 49, to the clip $m$, through the switch blade 50, the wires 51, and 52, to the connecting return wire 52ª as at 54, 55, up to the wire 56 thence to the blade 31, over wires 32, blade 33, wire 34 to the negative terminal of the battery D, and through the battery D and E in series, thus providing current, under 12 volts electro-motive force, for the primary of the igniting coil device, at time of starting.

It will therefore be seen that while the batteries may operate the dynamo electric machine as a motor, which in turn rotates the engine shaft, the controlling circuit for the igniting device, must first be closed, as by switch J, before the engine can become self propelling.

By referring to Fig. 6, it will be observed that the lighting circuit is permanently connected to the terminals E plus and E minus of the battery E and that this circuit is not disturbed during the time when the batteries are switched from series to parallel relation.

After the engine has become self propelling there can be no harm done if the circuits are left, as shown in Fig. 1, but the speed of the engine, under the conditions named, can not be accelerated, as movement of the spark-time controlling lever will open the ignition circuit, by switch J and the engine will stop. But when the controller switch is rocked to place the batteries in parallel relation with the dynamo as a generator, as shown in Fig. 4, this circuit is then closed by blade 108 and clip $f'$.

This specific feature is covered by my copending application referred to heretofore, and is not the subject of any of the claims of the present application.

The current that passes through the series field winding H gives the armature $A'$ of the dynamo considerable more turning torque than it would have if the field was energized only by the usual shunt winding. I therefore cut the shunt winding, entirely out of circuit, when the dynamo electric machine is being used as a motor, and pass the whole current through the series winding in such a way that the armature will revolve in the same direction that it revolves when operating as a generator and when energized by the shunt winding G.

Figure 5:
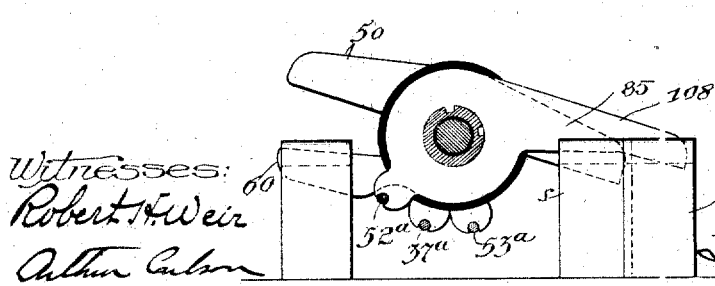
Fig. 5 shows the position of the controller switch blades and clips at this time.

When the engine becomes self propelling, and the dynamo is then driven thereby as a generator, it is desirable to have the dynamo charge the storage batteries and furnish current for the associated apparatus. I therefore, turn the rocking switch member into the position as shown in Figs. 4 and 5. In this position the dynamo is charging the batteries and furnishing current for the sparking apparatus and for the lighting system, and for other purposes for which it may be required, and at the same time the current is being held in check by the differential action of the field winding in conjunction with an intermittently acting electro-magnet or relay, marked "cut-out."

In rotatably connecting the dynamo electric machine with the engine I so arrange the speed relation, that when the dynamo is being driven as a generator by the engine, at the highest attainable speed of the latter under normal conditions of operation, the current generated will not be excessive to such an extent as to be injurious to the apparatus, and I provide additional means to reduce the current value at any and all speeds automatically operable when the batteries have become charged, or charged up to a given point for which the automatically operable device may be adjusted. This feature will be fully described later on.

In the positions indicated, in Figs. 4 and 5, it will be observed that the switch blades on the right hand of the axis of the rocking switch member are in contact with their respective clips, or battery terminals, and that all of the switches, on the left of the axis of the rocking member, are open, with the exception of the switch blade 60, which is in contact with the terminal $n$.

The direction of current is now traced from the dynamo, operating as a generator under this condition instead of a motor as previously, and the current will then flow from the positive pole $D'$, of the dynamo, pass over the wires, 6, 5, 4, 3, through the fuse M F, wire 3 to wires 2, 1, 105', to the positive terminals of all of the batteries, E, D, C, B, A, thence through all of the batteries in parallel and over the wires 105, 102, 100, 97, and 94, to the clips $e$, $d$, $c$, $b$ and $a$, respectively, over the switch blades 106, 104, 101, 98, and 95 to the common return wire $52^a$ and from the wire $52^a$, over the blade 107 to the clip $f$, over the wire $78'$, to the wire 81, over the wire 82, to the armature M, and since the armature is closed, in the position shown in Fig. 4, through the contacts N and O, over the wires 83 and 84, to the relatively low winding of few turns L, of the "cut-in" electro-magnet, thence over the wires 68, 69, 12, 10, 11, to the negative terminal $D^2$ of the dynamo, and through the series winding H in the opposite direction to the flow of current through the shunt winding G, so as to magnetically differentiate the shunt winding G, and thence to the armature of the dynamo, thus completing the main circuit with all of the batteries in parallel relation, as clearly evidenced from the diagrammatic connections shown.

When the dynamo starts to generate current, however, the main charging circuit will remain open until the contact between N and O is first closed, which is done in the following manner:—Starting at the positive terminal of the dynamo $D'$ over wires 6, 5, 4, 3, 2, 1, to the positive terminal of the battery E, from thence over the wires 58, 59, blade 60, clip $n$, over the wires 61, 62, 63, 64, 65, 66, 67, through the relatively high resistance coil K, thence over the wires 68, 69, 12, 10, 11, and through the series field winding H of the dynamo back to the armature $A'$. When the current passes through this circuit it energizes the electro-magnet or "cut-in" relay, attracting the armature M thereof, closing contacts N and O, thus establishing the previously traced, or main circuit employed by the dynamo when acting as a generator for charging the batteries in parallel relation.

The dynamo, being positively and directly connected to the engine is subject to great variations of speed and without means of limitation, the generation of excessive current, at such times, would operate to damage the windings of the system. The differential windings of the field magnets serve to control the rise of current within a given range. The maximum current that can be produced by the dynamo of my system is not too great for economical utilization when the batteries need charging. After the batteries have been charged, to a predetermined degree, after which current of less value may be used, the output of the dynamo is materially reduced by an automatic means consisting of the "cut-out" relay which is responsive to the rise in voltage of the battery when the latter is substantially charged.

The coil S of this relay is directly across the terminals of the battery by wires, 1, 2, 75, 76, and the wires 78', 79 and 80, respectively. When the battery is below its normal voltage sufficient current will not pass through coil S to attract its armature U against the retractile spring thereof and therefore resistance coil T, of said relay, remains short circuited by the armature U at contacts V, W.

As well known the voltage charging curve of a storage battery rises suddenly, at the time when the battery is practically fully charged, and at this time the coil S becomes sufficiently energized to attract the armature U, thus opening contacts V and W and cutting resistance, coil T in series with the shunt field winding G of the dynamo thus reducing the ampere turns of the field magnet and correspondingly reducing the current output of the dynamo. When the voltage of the battery again falls below normal the armature U will be released and coil T will be again short circuited and the current output of the dynamo correspondingly increased and thus the capacity of the dynamo is automatically controlled according to the requirements of the battery.

I have shown a test lamp T L', the lighting of which is controllable by the armature M. Before the "cut-in" armature M is attracted, the contacts P and Q are closed thus indicating a dim light, because the resistance R is then included in series with the lamp T L'. As the engine starts and speeds up the armature M is attracted in the manner above described and contacts P and Q are opened. The test lamp now shows no light, indicating that the battery is being charged by the dynamo.

When the dynamo voltage drops, due to the stopping of the engine, the armature M will break contacts N O, and make contacts P Q in obvious manner. This operation is without any material sparking at the contacts.

When starting the dynamo as a motor, the current is supplied by the batteries only, and to test the condition of the batteries, the switch T, S, is closed, thus closing the circuit which traces as follows: from the positive side of the battery E, for instance, over the wires, 1, 2, 40, to the lighting fuse L, F, the wires 41, 42, 43, 110, test lamp T L, wires 112, 113, T S, 114, 115, 116, back to the minus side of the battery E. When the dynamo is operating as a generator, the test light will burn as long as contact points P and Q of the "cut-in" relay are in contact, thus showing that the dynamo has not sufficient voltage to cause attraction of armature M. When the dynamo is acting as a generator, therefore, the lamp T L' acts as a telltale for the "cut-in" relay and shows the condition of the dynamo.

In diagram, Fig. 6, the dynamo circuits are not shown, and the batteries are in parallel relation with each other and the igniting circuit is broken, by rocking the switch blades to an intermediate position, as shown in Fig. 7.

In this diagram the lighting circuits are all shown to be open, but may be closed by a rotating switch consisting of three conducting parts, 160, 161, and 162, the construction and operation of said switch being more clearly apparent from the above mentioned co-pending application. I shall not therefore describe the operation of this switch.

D, L, is a dash light which may be lighted by means of the dash switch D, L, S. The circuit through the dash light may be traced as follows: From the positive side of the batteries, over the wires 1, 2, 40, 42, 110, 117, through the dash light switch, D, L, S, over wires 119, 120, 121, 122, through the dash lamp D, L, over the wire 123, to the switch blade 142, through the conducting piece 160 of the rotatable switch, over the blade 125, through the wires 126, 127, to the negative side of the battery.

While I have herein described in considerable detail my new system of electrical distribution, it is apparent that considerable change may be made, from the specific showing, without departing from the spirit and scope of the appended claims.

Having described my invention, and what I desire to secure by Letters Patent of the United States is:

1. In an electrical apparatus for starting an internal combustion engine, the combination of a plurality of independent batteries, a dynamo electric machine, an igniting device, for the fuel charge of the internal combustion engine, connections between the said battery, dynamo, and igniting device, a switch for controlling said connections, whereby the said batteries may be included in series relation, to operate the dynamo as a motor to start the engine, a separate switch for controlling said igniting device only when the said batteries are in series relation with said dynamo and means associated with the first mentioned switch for bridging the terminals of the last mentioned switch.

2. In an electrical apparatus for starting an internal combustion engine, the combination of a plurality of batteries, each composed of a plurality of cells, independent, stationary switch terminals, divided into three groups, to which said batteries are connected, movable terminals divided into three groups, a compound-wound dynamo electric machine connected to the engine, having a series field winding and a shunt field winding, means for moving said movable switch terminals respectively to connect said batteries in series relation with the armature and series winding of the dynamo electric machine, to operate the dynamo as a motor, and, alternatively, for connecting said batteries in parallel relation with the armature and series field winding and with the shunt field winding, to permit the dynamo to function as a differential generator, a spark producing device, a separate switch for controlling said spark producing device, only when said first mentioned switch is in position for operating the dynamo as a motor, and means associated with the first mentioned switch for bridging the terminals of the last mentioned switch when the circuits are arranged for operation of the dynamo as a generator.

3. In a system of electrical distribution, comprising a storage battery, a dynamo electric machine for charging said battery and for operation as a motor thereby, a spark producing means, and connections for said instrumentalities in combination with means for increasing the difference of potential at the terminals of the spark producing means, when the dynamo electric machine is operating as a motor.

4. In a system of electrical distribution, comprising in part storage battery, a dynamo electric machine for charging said battery and for operation as a motor thereby, a spark producing means, and connections for said instrumentalities in combination with a switch for changing the relation of said battery and dynamo and for increasing the differences of potential applied to the spark producing means when said dynamo is operating as a motor.

5. In a system of electrical distribution, comprising in part a storage battery composed of a plurality of cells, a dynamo electric machine for charging said battery and for operation as a motor thereby, a spark producing means connected to a given number of cells when the dynamo is operating as a generator, and means for including a greater number of cells therewith when said dynamo is operating as a motor.

6. In a system of electrical distribution comprising a storage battery, a dynamo electric machine adapted for operation as a motor when connected with the storage battery, an ignition system connected to receive its current from the storage battery, and means for increasing the voltage of the current supplied to the ignition system above its normal operating voltage when the dynamo electric machine is connected to the battery for operation as a motor.

7. In an electrical system for starting and igniting an internal combustion engine the combination of a source of electrical current, a starting motor, an ignition system, means for connecting the source of electrical current to the motor, and means for increasing the voltage of the ignition system above its normal operating voltage when the motor is connected for operation.

In testimony whereof I hereunto set my hand in the presence of two witnesses.

VINCENT G. APPLE.

In the presence of—
 FOREE BAIN,
 MARY F. ALLEN.